United States Patent
Deleuze et al.

(12) 
(10) Patent No.: US 10,936,171 B2
(45) Date of Patent: *Mar. 2, 2021

(54) DISPLAY OF IMAGES WITH ACTION ZONES

(71) Applicant: International Business Machines Corporation, Armonk, NY (US)

(72) Inventors: Ivan Deleuze, Montpellier (FR); Guilhaume Garcia, Le Cres (FR); Christophe Menichetti, Montpellier (FR)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/444,070

(22) Filed: Jun. 18, 2019

(65) Prior Publication Data

US 2019/0302988 A1 Oct. 3, 2019

Related U.S. Application Data

(63) Continuation of application No. 15/877,712, filed on Jan. 23, 2018, now Pat. No. 10,387,012.

(51) Int. Cl.
*G06F 17/00* (2019.01)
*G06F 3/0484* (2013.01)
(Continued)

(52) U.S. Cl.
CPC .......... *G06F 3/04842* (2013.01); *G06F 16/95* (2019.01); *G06F 16/9538* (2019.01); *G06F 40/197* (2020.01)

(58) Field of Classification Search
CPC .... G06F 40/197; G06F 16/95; G06F 16/9538; G06F 3/04842
See application file for complete search history.

(56) References Cited

U.S. PATENT DOCUMENTS 5,592,607 A 1/1997 Weber et al.
5,983,244 A * 11/1999 Nation .................. G06F 16/957
715/236

(Continued)

FOREIGN PATENT DOCUMENTS

CN 104408204 3/2015

OTHER PUBLICATIONS

Brandon Smith, Jun. 21, 2016, Content Jumping (and How to Avoid It), 4 pages.

(Continued)

*Primary Examiner* — Laurie A Ries
(74) *Attorney, Agent, or Firm* — Schmeiser, Olsen & Watts, LLP; Nicholas L. Cadmus

(57) ABSTRACT

An operation of an action zone in an image displayed on a display device is received. The operation has a defined location in the image and a current time for an operation of the action zone. A time delay is applied to the current time to obtain a selection time for the operation of the action zone, by calculating the selection time as the current time minus the time delay. A map with a time stamp immediately prior to the selection time is determined from maps of the image. Each map defines, for a specific time stamp, a location for each action zone in the image. An action zone defined in the determined map and matching the defined location of the operation of the action zone in the image is operated.

20 Claims, 6 Drawing Sheets

(51) Int. Cl.
*G06F 16/95* (2019.01)
*G06F 16/9538* (2019.01)
*G06F 40/197* (2020.01)

(56) References Cited

U.S. PATENT DOCUMENTS

| | | | |
|---|---|---|---|
| 5,991,781 A | 11/1999 | Nielsen | |
| 7,617,294 B1* | 11/2009 | Harding | G06F 16/9577 709/217 |
| 8,533,580 B1 | 9/2013 | Xu | |
| 8,644,623 B2* | 2/2014 | Shmouely | H04L 67/02 382/219 |
| 9,444,711 B1* | 9/2016 | Siganporia | H04L 67/2823 |
| 10,146,743 B2* | 12/2018 | Zhang | G06F 3/0481 |
| 2003/0137522 A1* | 7/2003 | Kaasila | G06F 16/9577 345/619 |
| 2005/0171932 A1 | 8/2005 | Nandhra | |
| 2006/0212396 A1 | 9/2006 | Johnston et al. | |
| 2006/0294038 A1 | 12/2006 | Grossfeld et al. | |
| 2008/0059571 A1 | 3/2008 | Khoo | |
| 2008/0235594 A1 | 9/2008 | Bhumkar et al. | |
| 2010/0153836 A1* | 6/2010 | Krassner | H04L 67/36 715/234 |
| 2013/0141612 A1 | 6/2013 | Bhatt et al. | |
| 2014/0080428 A1* | 3/2014 | Rhoads | H04W 4/025 455/88 |
| 2014/0122994 A1 | 5/2014 | Beckmann et al. | |
| 2014/0344705 A1 | 11/2014 | Dimitrov | |
| 2015/0077326 A1* | 3/2015 | Kramer | G06F 3/0325 345/156 |
| 2015/0227115 A1 | 8/2015 | Dietz | |
| 2015/0379558 A1 | 12/2015 | Jancar et al. | |
| 2017/0254648 A1 | 9/2017 | Gupta et al. | |
| 2018/0173410 A1 | 6/2018 | Chen | |
| 2018/0225885 A1* | 8/2018 | Dishno | G06F 16/9577 |
| 2019/0073342 A1 | 3/2019 | Wilson et al. | |

OTHER PUBLICATIONS

Michael Scharnagl, Aug. 29th, 2016, Ways to Reduce Content Shifting on Page Load, 8 pages.
Notice of Allowance (Apr. 11, 2019) for U.S. Appl. No. 15/877,712, filed Jan. 23, 2018.

* cited by examiner

US 10,936,171 B2

DISPLAY OF IMAGES WITH ACTION ZONES

This application is a continuation application claiming priority to Ser. No. 15/877,712, filed Jan. 23, 2018.

TECHNICAL FIELD

The present invention relates to display of an image having one or more action zones.

BACKGROUND

As a browser loads a web page into memory and displays the web page on a display device, links on the web are not all loaded and displayed simultaneously. Thus, positions of the links may be displayed on the display device such that the displayed positions of the links may change dynamically while the web page is being loaded. As a result, user selection of the links on the display device while the web page is being loaded may result in clicking on links that differ from the links selected by the user.

SUMMARY

Embodiments of the present invention provide a method, and associated computer program product and computer system. One or more processors of the computer system display an image on a display device. The image corresponds to a web page and comprises one or more action zones. The one or more processors store a plurality of maps of the image. Each map defines, for a specific time stamp, a location for each action zone in the image. The one or more processors receive an operation by a user of an action zone in the image displayed on the display device. The operation has a defined location in the image and a current time for an operation of the action zone. The one or more processors apply a time delay to the current time to obtain a selection time for the operation of the action zone, by calculating the selection time as the current time minus the time delay. The one or more processors determine, from the plurality of maps, a map with a time stamp immediately prior to the selection time. The one or more processors operate an action zone defined in the determined map and matching the defined location of the operation of the action zone in the image.

BRIEF DESCRIPTION OF THE DRAWINGS

Embodiments of the present invention will now be described, by way of example only, with reference to the following drawings.

DETAILED DESCRIPTION

Figure 1:
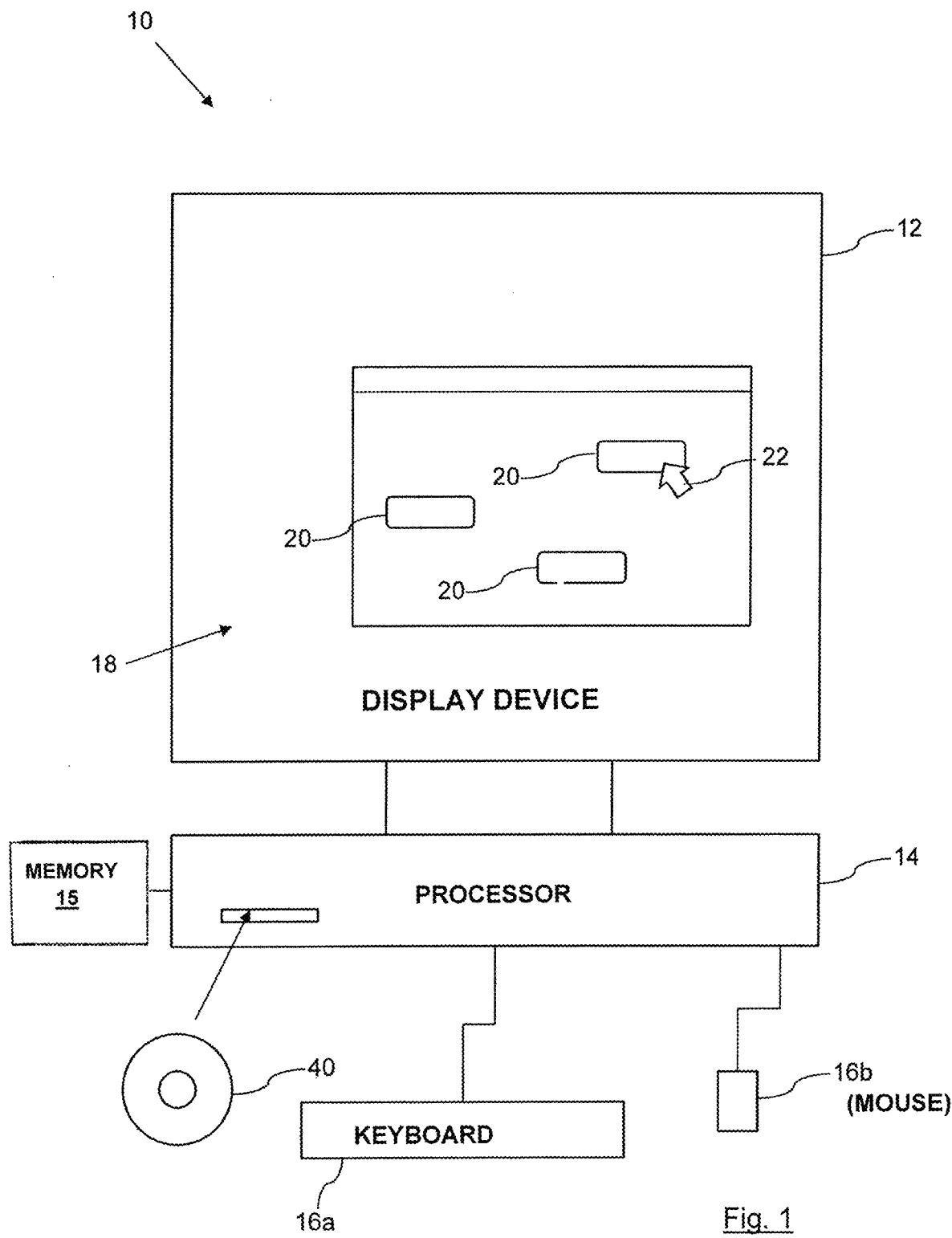
FIG. 1 is a schematic diagram of a system including a display device, in accordance with embodiments of the present invention.

FIG. 1 is a schematic diagram of a system 10 including a display device 12, in accordance with embodiments of the present invention. The system 10 comprises a processor 14 connected to the display device 12, and a memory 15 (e.g. RAM) connected to the processor 14. The processor 14 denotes one or more processors. The memory 15 denotes one or more memories. The system 10 also comprises two user interface devices 16 (i.e, 16a and 16b) which are connected to the processor 14. In one embodiment, the user interface device 16a is a keyboard and the user interface device 16b is a mouse. FIG. 1 shows a conventional desktop computing arrangement as universally used by people in business, education and at home to perform tasks such as connecting to the Internet with a browser over a network connection. The processor 14 controls what is displayed on the display device 12, for example by maintaining one or more display buffers which contain pixel data for an image 18 shown on the display device 12. A computer readable hardware storage medium 40 (or hardware storage device 40) is provided, which may be a computer program product (e.g., a CD-ROM, floppy disk, hard disk, etc.) that stores program code comprising instructions configured to control the processor 14 to operate the system 10. The hardware storage device (or medium) 40 denotes one or more hardware storage devices (or mediums). The processor 14 executes instructions from the program code to operate the processor 14 via the memory 15.

The image 18 comprises one or more action zones 20, which are areas of the image 18 with which a user can interact directly through an on-screen cursor 22. For example, if the user is accessing a browser as a connection to the Internet, then a webpage accessed over the Internet may have numerous action zones 20 which a user can click on with the cursor 22 to navigate to different webpages. The action zones 20 may be implemented as buttons 20 or hyperlinks. A webpage may be provided with multiple "virtual buttons" and hyperlinks that the user can press by locating the on-screen cursor 22 on the virtual button or hyperlink and clicking the mouse 16b to connect through the button or link to navigate to a new webpage or access a webservice.

An action zone 20 is any area of the image 18 with which the user can directly interact to perform a user interface action. On a webpage there will be multiple links and virtual buttons that the user can click on with the user's cursor 22, in order to perform some specific action such as navigation to a new webpage. All web browsers load webpages and display the action zones 20 to the end user through the browser's on-screen user interface. The user interaction with the on-screen buttons 20 can also be via the keyboard 16a of the system. Many browsers default a specific button on the screen to the return key and also allow keyboard navigation of clickable buttons 20 that are shown within the image 18.

The system 10, and more specifically the processor 14, is arranged to operate in a specific manner in relation to the loading and displaying of images 18 that contain action zones 20, with which the user can interact. This operation is specifically relevant to the presentation of webpages by a browser, but is applicable to any image 18 that contains action zones 20 that are accessed by the end user through on-screen selection. Although many modern users of browsers connect to the Internet at very high speeds over high performance network connections such as broadband, webpages shown by browsers can take a significant time to load completely and be displayed as intended.

One example of where this significant load time of browsers occurs is when a webpage includes an advertisement, for example as a banner at the top of the webpage. Very many webpages that display advertisements do so with reference to an ad server, which provides the advertisement being displayed.

Figure 2:
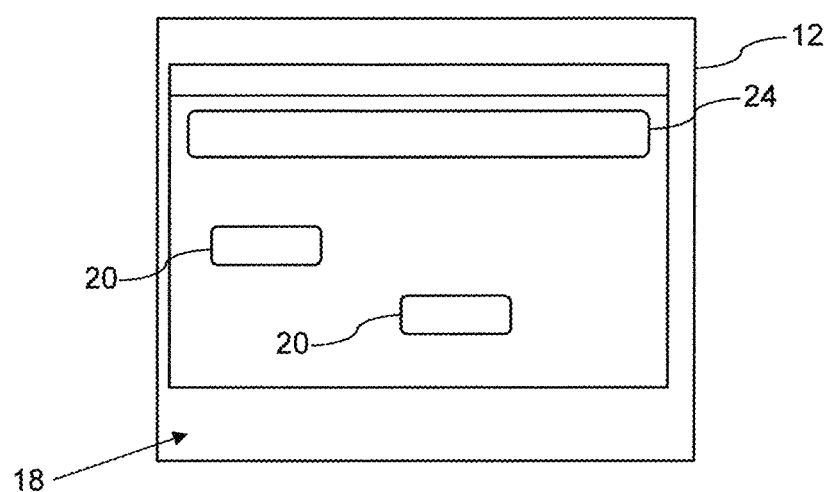
FIG. 2 is a schematic diagram of an image containing action zones, in accordance with embodiments of the present invention.

FIG. 2 is a schematic diagram of an image 18 containing action zones 20, in accordance with embodiments of the present invention. FIG. 2 shows the image 18 on the display device 12, which includes a banner 24 for an advertisement. The banner 24 is also an action zone, since a user can click on the banner 24 to navigate to a webpage relating to the product or service being advertised in the banner 24. When a user navigates to the original webpage, the user's browser may implement a load and display process that will load and display the webpage while the content of the banner 24 is also being called and loaded.

The effect of this load and display process is that the webpage may change layout and content in front of the user's eyes, which is particularly noticeable when the webpage is first loaded. The image 18 and the location of one or more of the action zones 20 may change in the first few seconds as the banner 24 is loaded and displayed. Neither the local browser nor the original webpage will know the size and content of the banner 24 before the banner 24 is loaded, which will result in an untidy reorganizing of the image 18 as different elements of the banner 24 are loaded and displayed. The effect of this load and display process is that the action zones 20 can change position as different elements are displayed.

In order to counteract the problem of the changing position of the action zones 20 in an image 18, the processor 14 is arranged to store a plurality of maps of the image 18, each map defining, for a specific time stamp, a location for each action zone 20 in the image 18.

Figure 3:
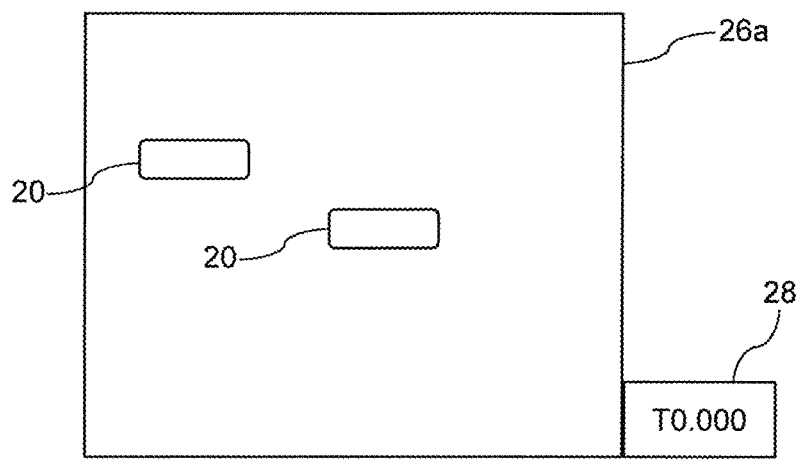
FIG. 3 is a schematic diagram of two maps of action zones in respective images, in accordance with embodiments of the present invention.
Figure 3:
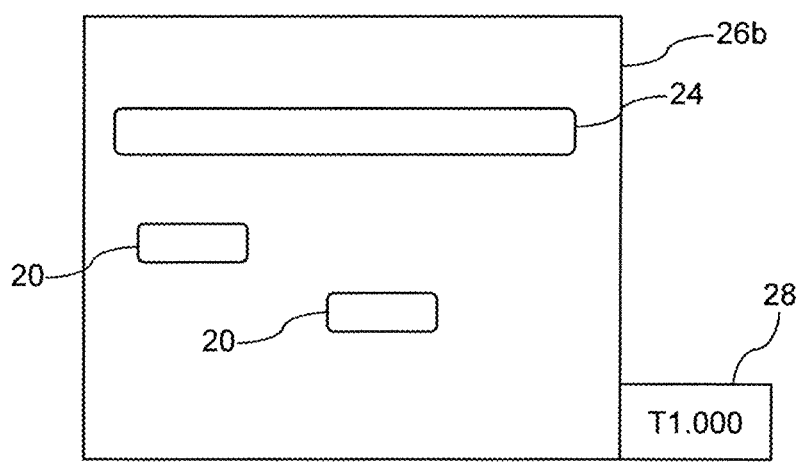

FIG. 3 is a schematic diagram of two maps 26 of action zones in respective images, in accordance with embodiments of the present invention. FIG. 3 shows two maps 26 (i.e., 26a and 26b), each map having a respective time stamp 28. The first map 26a shows a webpage that has been first loaded in response to the user's original request for that webpage and the second map 26b shows the same webpage soon (e.g., one second later) after a banner 24 (which is also an action zone 20) has been loaded and displayed within the image 18.

The maps 26 are shown in FIG. 3 as being two-dimensional shapes matching the shapes of the images 18 and action zones 20, but the data that is stored in each map 26 can be represented in many different forms. For example, the x, y co-ordinates, and the size and shape of each action zone 20 can be stored within the map 26, for example as a list of the different action zones 20. Each map 26 contains information that allows the action zones 20 to be located within the image 18 for the specific time stamp 28 of that map 26. Any user accessible content within the image 18 counts as an action zone 20 and is therefore stored within the respective map 26 when that respective map 26 is created.

The processor 14 is arranged to detect a change in the image 18 and create a map 26 of the image 18, the map 26 defining, for a specific time stamp 28, a location for each action zone 20 in the image 18. Thus, every time the processor 14 detects a change in the image 18 that is being displayed on the display device 12, a new map 26 is created with a new time stamp 28 and the action zones 20 within the respective image 18 are stored within the new map 26. Any change in the image 18 leads to a new map 26 being created and a history of the changes in the location of the action zones 20 is stored in the different maps.

When a user makes an attempt to operate an action zone 20 within an image 18, for example by clicking on a link within a webpage, there is a possibility that the image 18 will change in the short period of time that it takes the user to make a mental selection and perform the physical action of clicking on the user's mouse 16b. Tests show that there is a delay in the average person's decision making and performing of the physical action, in relation to the use of computer interface device, of a time period of between 0.15 and 1.00 second. During this time period if the webpage has changed significantly, then the end result may be that the user activates the wrong action zone 20.

To reduce the risk of such an occurrence taking place, the processor 14, after receiving an operation of an action zone 20 in the image 18 displayed on the display device 12, where the operation has a defined location in the image 18 and a current time for the operation of the action zone 20, will apply a time delay to the current time to obtain a selection time for the operation of the action zone 20, the selection time being earlier than the current time by the time delay. The time delay can by 0.50 of a second, for example. The time delay is applied to compensate for user's reaction time and to take into account the fact that the webpage being accessed may have very recently changed. In one embodiment, the time delay is predetermined. In one embodiment, the time delay may be determined or changed dynamically by user input received at any time.

Figure 4:
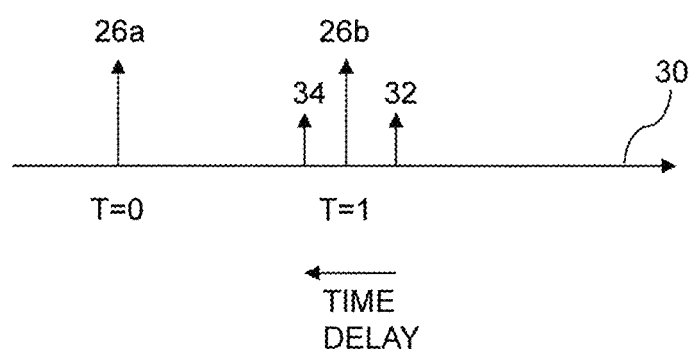
FIG. 4 is a schematic diagram of a timeline, in accordance with embodiments of the present invention.

FIG. 4 is a schematic diagram of a timeline 30, in accordance with embodiments of the present invention. FIG. 4 illustrates the timeline 30 which shows the two different maps 26a and 26b of the action zones 20, located on the timeline 30 according to the respective time stamps 28 of the different maps 26a and 26b. A user operation 32 is also shown on the timeline 30 and this operation is the selection of one of the action zones 20 within the image 18. As can be seen from the timeline 30, the current time of the user operation 32 is after both of the two maps 26 on the timeline 30, although the operation 32 is so close to the second map 26b, there is a possibility of the user actually intending the operation 32 to be in relation to the first map 26a. The processor 14 applies the time delay to the current time, by subtracting time delay from the current time, to obtain a selection time 34 (shown on the timeline 30) for the operation 32 of the action zone 20, the selection time 34 being earlier than the current time, which results in the operation 32 being performed in relation to the first map 26a.

Figure 5:
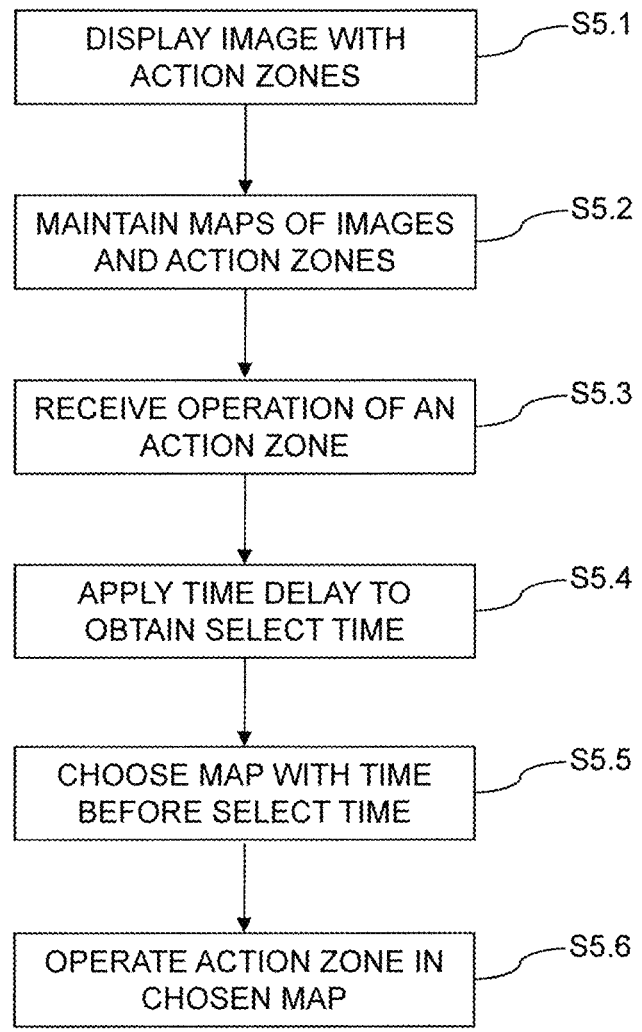
FIG. 5 is a flowchart of a method of operating a system, in accordance with embodiments of the present invention.

FIG. 5 is a flowchart of a method of operating a system, in accordance with embodiments of the present invention. The method in the flowchart of FIG. 5 is carried out by the processor 14.

Step S5.1 comprises displaying an image 18 on the display device 14, the image 18 corresponding to a web page and comprising one or more action zones 20.

Step S5.2 comprises maintaining a plurality of maps 26 of the image 18, each map 26 defining, for a specific time stamp 28, a location for each action zone 20 in the image 18, so that the processor 14 creates multiple maps 26 of the image 18 as the image 18 changes over time, for example while initially loading a webpage.

Step S5.3—comprises receiving by the user an operation 32 of an action zone 20 in the image 18 displayed on the display device 14, the operation 32 having a defined location in the image 18 and a current time for the operation 32 of the action zone 20.

Step S5.4, in response to the user performing an operation, comprises applying a time delay to the current time, by subtracting the time delay from the current time, to obtain a selection time for the operation of the action zone, the selection time being earlier than the current time. Therefore, the processor 14 compensates for the delay in the user's action. Applying a time delay to a current time is defined as subtracting the time delay from the current time.

Step S5.5 comprises determining, from the plurality of maps 26, a map 26 with a time stamp 28 immediately prior to the selection time.

The method terminates with step S5.6, which comprises operating an action zone 20 defined in the determined map 26 matching the defined location of the operation of the action zone 20 in the image 18. Once the user's time delay has been taken into account, the map 26 that was live at the selection time (the current time minus the time delay) is used to determine which action zone 20 to use in response to the location of the user's action. Each action zone 20 has an associated one or more operations to be performed in response to the action zone 20 being selected by the user. Operating an action zone 20 is defined as performing, by the processor 14, the one or more operations associated with the action zone 20.

Figure 6:
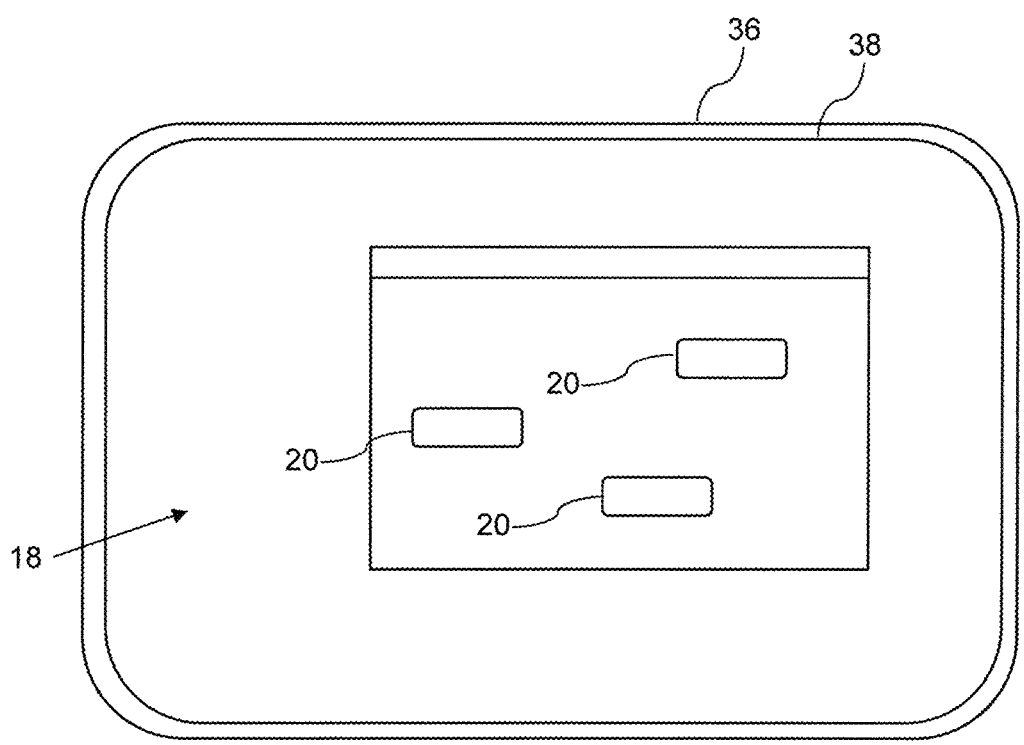
FIG. 6 is a schematic diagram of a touchscreen device, in accordance with embodiments of the present invention.

FIG. 6 is a schematic diagram of a touchscreen device 36, in accordance with embodiments of the present invention.

Although the operation of the processor 14 has been described above in relation to a desktop computer system 10 with a mouse 16a and display device 12, the use of the maps 26 and a time delay can be used in other computing systems, such as the touchscreen device 36 shown in FIG. 6. The touchscreen device 36 (a tablet computer) has a touchscreen 38 that is a combined display device and user interface device. The touchscreen 38 displays an image 18 that contains action zones 20. As discussed above, loading of a webpage that includes a banner advertisement can result in the page being loaded in incomplete form to start with.

A user may press on an action zone 20 on the touchscreen 38 with the user's finger in order to make a selection of that action zone 20. If the webpage continues to load while the user is performing the action of making a touch on the touchscreen 38, then the desired action zone 20 may move or no longer be shown on the touchscreen 38, which has the potential to cause the user to touch the wrong action zone 20 and the processor 14 therefore applies a time delay to the user's action and chooses a map 26 of the image 18 and action zones 20 based on an earlier time.

The processor 14 can also be arranged to receive a user input in relation to the time delay and set the time delay according to the received user input. The user can set the length of the time delay that is applied to the user's input, either directly by adjusting the time length in a settings menu or by performing a test which will display action zones 20 in the image 18 and ask the user to click on the action zones 20 as soon as the action zones 20 appear, thereby determining a likely average or mean time delay for the user when performing the action of selecting an on-screen action zone 20.

The time delay (TD) determined by the test (i.e. determined from analysis of the test data obtained from the test) may have a statistical uncertainty and may be determined by the test data to be in a range of $TD_m \pm \Delta TD$, where $TD_m$ is a mean time delay and $\Delta TD$ is an uncertainty in the time delay (e.g., 1, 2 or 3 standard deviations from the mean time delay $TD_m$).

In one embodiment, the time delay used in step S5.4 is the mean time delay $TD_m$.

In one embodiment, the time delay used in step S5.4 is randomly selected, from the range of $TD_m \pm \Delta TD$ (i.e., in the range of $TD_m - \Delta TD$ to $TD_m + \Delta TD$), between steps S5.3 and S5.4, in accordance with a probability density function (PDF) characterized by a probability density of zero outside the range, wherein the probability density function within the range may be, inter alia, normally distributed (i.e., a normal probability distribution truncated at the boundaries of the range) or uniformly distributed (i.e., a uniform probability distribution).

The processor 14 can also be arranged to discard a map 26 after a specific time period has elapsed from the time stamp of the respective map 26. The processor 14 does not keep the maps 26 indefinitely and will discard the older maps 26 after a certain time has elapsed. This time period can actually be quite short, such as ten seconds, as there is no need to keep old maps 26 once the user's time delay has elapsed, since any selection made by the user will only be in relation to action zones 20 that have existed on the display device 12 very recently and changes made to the image 18 over ten seconds ago no longer have relevance to the user selecting an action zone 20.

Use of the time delay by the present invention improves the functioning of a computer that comprises the processor 14, at least by reducing a probability of operating, by the processor 14, an action zone that differs from a different action zone intended by the user to be operated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A computer program product of the present invention comprises one or more computer readable hardware storage devices having computer readable program code stored therein, said program code containing instructions executable by one or more processors to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

What is claimed is:

1. A method, said method comprising:
   receiving, by one or more processors of a computer system, an operation by a user of an action zone in an image displayed on a display device, said operation having a defined location in the image and a current time for an operation of the action zone;
   applying, by the one or more processors, a time delay to the current time to obtain a selection time for the operation of the action zone, by calculating the selection time as the current time minus the time delay;
   determining, by the one or more processors from a plurality of maps of the image, a map with a time stamp immediately prior to the selection time, each map defining, for a specific time stamp, a location for each action zone in the image; and operating, by the one or more processors, an action zone defined in the determined map and matching the defined location of the operation of the action zone in the image.

2. The method of claim 1, said method further comprising:
detecting, by the one or more processors, a change in the image; and
creating, by the one or more processors, one map of the plurality of maps of the image, said one map defining, for a specific time stamp, a location for each action zone in the image.

3. The method of claim 1, said method further comprising:
receiving, by the one or more processors, a user input in relation to the time delay; and
setting, by the one or more processors, the time delay according to the received user input.

4. The method of claim 1, said method further comprising:
discarding, by the one or more processors, a map after a specific time period has elapsed from the time stamp of the respective map.

5. The method of claim 1, wherein the time delay is a predetermined time delay.

6. The method of claim 1, said method further comprising: after said receiving the operation and before said applying the time delay, selecting, by the one or more processors, the time delay from a range of $TD_m \pm \Delta TD$, wherein $TD_m$ is a mean time delay determined from test data and $\Delta TD$ is an uncertainty in the time delay determined from the test data.

7. The method of claim 6, wherein said selecting the time delay from the range comprises selecting the time delay as being $TD_m$.

8. The method of claim 6, wherein said selecting the time delay from the range comprises randomly selecting the time delay from the range in accordance with a probability density function characterized by a probability density of zero outside the range.

9. The method of claim 8, wherein the probability density function within the range is a normally distributed.

10. The method of claim 9, wherein the probability density function within the range is uniformly distributed.

11. A computer program product, comprising one or more computer readable hardware storage devices having computer readable program code stored therein, said program code containing instructions executable by one or more processors of a computer system to implement a method, said method comprising:
receiving, by the one or more processors, an operation by a user of an action zone in an image displayed on a display device, said operation having a defined location in the image and a current time for an operation of the action zone;
applying, by the one or more processors, a time delay to the current time to obtain a selection time for the operation of the action zone, by calculating the selection time as the current time minus the time delay;
determining, by the one or more processors from a plurality of maps of the image, a map with a time stamp immediately prior to the selection time, each map defining, for a specific time stamp, a location for each action zone in the image; and
operating, by the one or more processors, an action zone defined in the determined map and matching the defined location of the operation of the action zone in the image.

12. The computer program product of claim 1, said method further comprising:
detecting, by the one or more processors, a change in the image; and
creating, by the one or more processors, one map of the plurality of maps of the image, said one map defining, for a specific time stamp, a location for each action zone in the image.

13. The computer program product of claim 11, said method further comprising:
receiving, by the one or more processors, a user input in relation to the time delay; and
setting, by the one or more processors, the time delay according to the received user input.

14. The computer program product of claim 11, said method further comprising:
discarding, by the one or more processors, a map after a specific time period has elapsed from the time stamp of the respective map.

15. The computer program product of claim 11, wherein the time delay is a predetermined time delay.

16. A computer system, comprising one or more processors, one or more memories, and one or more computer readable hardware storage devices, said one or more hardware storage device storing program code executable by the one or more processors via the one or more memories to implement a method, said method comprising:
receiving, by the one or more processors, an operation by a user of an action zone in an image displayed on a display device, said operation having a defined location in the image and a current time for an operation of the action zone;
applying, by the one or more processors, a time delay to the current time to obtain a selection time for the operation of the action zone, by calculating the selection time as the current time minus the time delay;
determining, by the one or more processors from a plurality of maps of the image, a map with a time stamp immediately prior to the selection time, each map defining, for a specific time stamp, a location for each action zone in the image; and
operating, by the one or more processors, an action zone defined in the determined map and matching the defined location of the operation of the action zone in the image.

17. The computer system of claim 16, said method further comprising:
detecting, by the one or more processors, a change in the image; and
creating, by the one or more processors, one map of the plurality of maps of the image, said one map defining, for a specific time stamp, a location for each action zone in the image.

18. The computer system of claim 16, said method further comprising:
receiving, by the one or more processors, a user input in relation to the time delay; and
setting, by the one or more processors, the time delay according to the received user input.

19. The computer system of claim 16, said method further comprising:
discarding, by the one or more processors, a map after a specific time period has elapsed from the time stamp of the respective map.

20. The computer system of claim 16, wherein the time delay is a predetermined time delay.

* * * * *